May 22, 1945.　　A. J. LOMBARDI　　2,376,370
CONNECTING DEVICE
Filed Jan. 28, 1944　　2 Sheets-Sheet 1

INVENTOR.
ANTHONY J. LOMBARDI
BY
ATTORNEY

May 22, 1945.  A. J. LOMBARDI  2,376,370
CONNECTING DEVICE
Filed Jan. 28, 1944   2 Sheets-Sheet 2
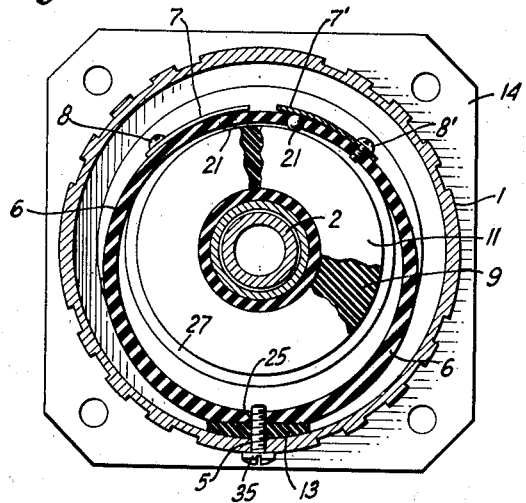
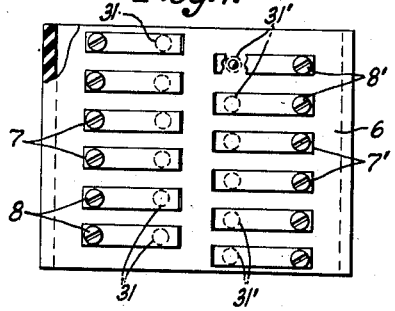
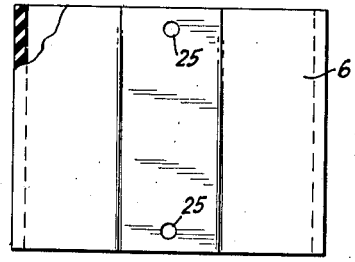
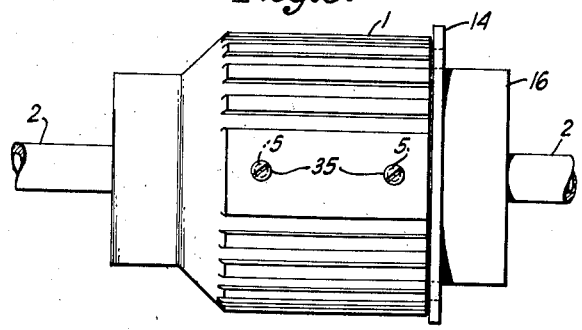
INVENTOR.
ANTHONY J. LOMBARDI
BY
ATTORNEY Patented May 22, 1945

2,376,370

UNITED STATES PATENT OFFICE 2,376,370

CONNECTING DEVICE

Anthony J. Lombardi, Floral Park, N. Y., assignor to Bruno Patents, Inc., Long Island City, N. Y.

Application January 28, 1944, Serial No. 519,992

4 Claims. (Cl. 174—21)

This invention relates to an improved electrical and gas conducting device adapted to provide electrical and gaseous connection between a stationary structure and a second structure which is capable of rotary movement relative to said stationary structure. It has particular relation to a connecting device of this type, in which the electrical connecting means are designed in such a manner as to permit the use of a relatively large number of electrical leads, for example 8–12 leads, or more.

The main object of my present invention is to provide a gaseous and electrical connector assembly of the above mentioned type, in which gaseous connection between a stationary structure and a rotary structure, such as the stationary gaseous source of an airplane, tank or the like, may be made in a known manner, while the electrical connecting means between said rotary and stationary structure are adapted to receive the incoming and outgoing leads and to provide for safe and noiseless electrical connection during rotation of said rotary structure.

Another object of this invention consists in providing a connector assembly of the above mentioned type, which permits arrangement of a relatively large number of incoming and outgoing electric leads in a limited, relatively small space.

It is also an object of my present invention to provide an electrical swivel joint of the above mentioned type, which can be easily assembled and taken apart and is easily accessible to repairs, if necessary.

Other objects and the advantages of this invention will be apparent to those skilled in the art from the appended claims and the following specification and drawings which, by way of example, illustrate a preferred embodiment of my invention, and in which Fig. 1 is a longitudinal sectional view of a device embodying my present invention;

Fig. 6 illustrates an end view from plane 6—6 of Fig. 1, of the device shown in Fig. 1, partly in section;

Figs. 7 and 8 illustrate an insulating cylindrical member of the device shown, said member being provided with spherical elements and spring elements used as electrical contact means, in top view and bottom view, respectively, and Fig. 9 is a side view of the assembled device shown in Fig. 1.

Figure 1:
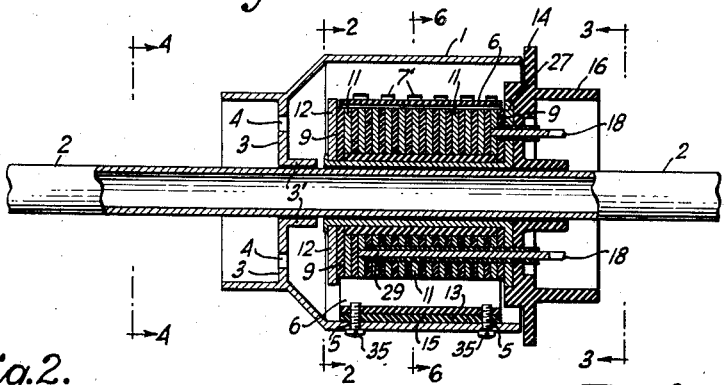

Referring now more particularly to Figure 1, 1 is a rotatable bell-shaped, preferably metallic, cylindrical body provided with a disc-like partition 3, said partition having a central circular opening and a short tubular extension 3'. Element 3 is also provided with the necessary number of perforations or holes 4 for the outgoing electric leads, for example with 12 holes. The bell-shaped body 1 carries an axially arranged tube 2, extending through the central opening of disc 3 and extension 3', and rigidly connected with these elements. Tube 2 is rotatable together with body 1, and serves for the introduction of a gaseous medium, particularly oxygen into a rotary structure. Connection of the right end of rotatable tube 2 with a stationary gaseous source may be made in any suitable manner, for example in the manner shown in U. S. Patent No. 2,291,071 issued to Bruno Patents, Inc., on July 28, 1942, and this connection does not form a part of my present invention.

Figure 2:
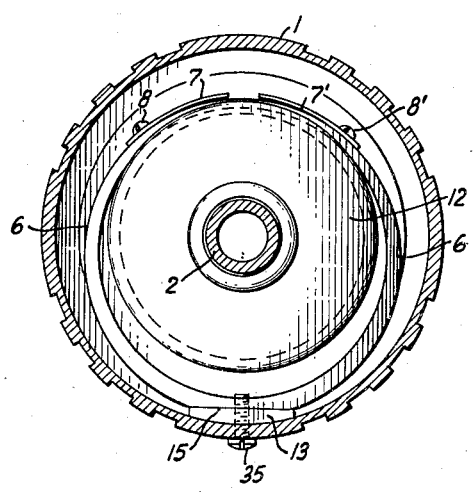
Figs. 2 and 3 are enlarged end views of the device shown in Fig. 1, viewed from the left and the right, respectively.
Figure 3:
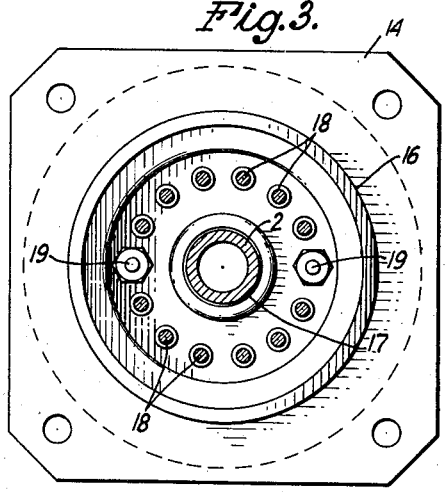
Figure 4:
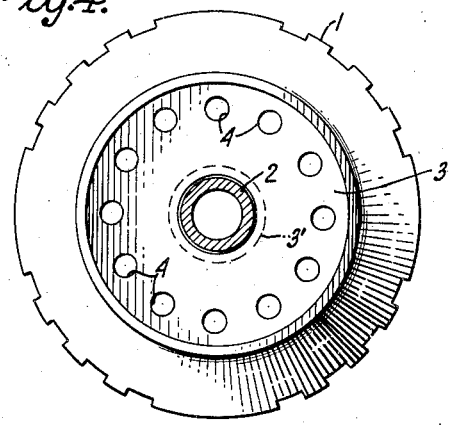
Fig. 4 is also an enlarged end view of said device viewed from the left.
Figure 5:
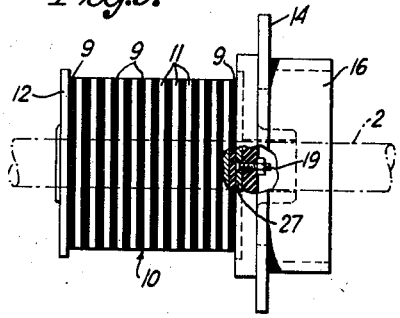
Fig. 5 is a side view of the contact ring assembly shown in Fig. 1, assembled with certain other elements of the device.

Body 1 is further adapted to receive a cylindrical element 6 of insulating material, such as laminated Bakelite material. This cylindrical body 6 is provided with 12 holes 31 and 31' for receiving metallic ball-shaped members 21, adapted to make electrical contact with registering conducting rings 11 of the contact ring assembly best shown in Figs. 1 and 5. Six of these holes 31, are aligned in a first row parallel to the axis of cylindrical body 1, while the remaining six holes 31', are aligned and form a second staggered row parallel and near to said first line, as shown in Fig. 7. The ball-shaped members 21 fit into the holes and are held in place in a slightly inwardly protruding position by two series of correspondingly arranged springs 7 and 7', which are fastened to body 6 by means of screws 8 and 8' adapted to be electrically connected to the outgoing electrical leads. Cylindrical body 6 is also provided with two holes 25, registering with holes 5 in the bell-shaped cylindrical body 1, and adapted to receive fastening screws 35. As shown in Figures 2 and 5, the upper wall portion of cylinder 6 is somewhat ground off. Its bottom part is cut off at 15 and a registering element 13 of insulating material is inserted between cylindrical bodies 1 and 6.

In the embodiment illustrated in Figures 1 and 5, the contact ring assembly generally denoted by reference number 10, includes twelve conducting rings 11 and thirteen insulating rings 9. This contact ring assembly is held assembled by flanged tube 27, adapted to receive tube 2 and disc 12. Each of the contact rings has an electrically insulated duct bolt 29, and is connected with a soldering lug 18. The incoming electric leads are connected with these soldering lugs. The contact ring assembly is assembled and rigidly connected by means of screws 19 with the square shaped plate 14, which can be fastened to a panel (not shown in the drawing), and is provided with a tubular part 16. Thus, the contact ring assembly 10 and plate 14 form a stationary unit.

In order to assemble the device shown in Fig. 1, first insulating element 13 and insulating cylinder 6 are introduced into bell-shaped body 1, and screws 35 are loosely inserted in holes 5 and 25. Then the contact ring assembly 10 is introduced into cylinder 6, whereby tube 2 extends through central axial bore 17 of the contact ring assembly. Upon tightening screws 35, cylinder 6 will occupy an eccentric position as illustrated in Fig. 2, and will be rigidly connected to body 1, with which it forms a rotatable unit while the ball-shaped members arranged in the upper part of cylinder 6 come in contact with contact rings of the contact ring assembly. During rotation of this unit, balls 21 make electrical contact with the corresponding contact rings of the stationary contact ring assembly, and thus form an electrical connection between the incoming stationary electrical leads connected to the contact rings and the outgoing leads (not shown) electrically connected to springs 7 and 7'. These outgoing leads can be conveniently arranged in the space provided between the upper inner surface portion of body 1, and the upper outer surface of eccentrically arranged insulating cylinder 6.

Instead of the contact ring assembly illustrated in the drawings, other contact ring assemblies containing more or less contact rings than those shown, may be, of course, used. Other elements of the construction illustrated in my drawings may also be modified, as my invention is not limited to the embodiment shown, but may be embodied in various equivalent forms, within the limits of my invention as defined in the appended claims.

I claim:

1. In an electrical and gas conducting device adapted to provide electrical and gaseous connections between a stationary structure and a second structure which is capable of a rotary movement relative to said stationary structure, an assembly comprising a rotatable bell-shaped body housing a centrally arranged gas-conducting tube connected to and rotatable with said body, said body also housing an eccentrically arranged tubular, insulating member adapted to be fastened to and rotated with said body, said insulating member housing a stationary contact ring assembly adapted to be connected with stationary electric sources, said contact ring assembly being held in place by said gas conducting tube passing through a central bore of the contact ring assembly which is concentrically arranged with respect to the bell-shaped body, said tubular insulating member carrying metallic ball-shaped contact elements adapted to make electrical contact with contact rings of said contact ring assembly.

2. In an electrical and gas conducting device adapted to provide electrical and gaseous connections between a stationary structure and a second structure which is capable of a rotary movement relative to said stationary structure, an assembly comprising a rotatable, cylindrical bell-shaped body housing a centrally arranged gas-conducting tube connected to and rotatable with said body, said body also housing an eccentrically arranged tubular, cylindrical insulating member adapted to be fastened to and rotated with said body, said insulating member housing a stationary contact ring assembly adapted to be connected with stationary electric sources, said contact ring assembly being held in place by said gas conducting tube passing through a central bore of the contact ring assembly which is concentrically arranged with respect to the bell-shaped body, said insulating cylinder being provided with holes arranged in its surface portion adjacent to the cylindrical surface of the contact ring assembly, said holes receiving ball-shaped contact elements adapted to make electrical contact with contact rings of said contact ring assembly.

3. In an electrical and gas conducting device adapted to provide electrical and gaseous connection between a stationary structure and a second structure which is capable of a rotary movement relative to said stationary structure, an assembly comprising a rotatable, cylindrical bell-shaped body housing a centrally arranged gas-conducting tube connected to and rotatable with said body, said body also housing an eccentrically arranged tubular, cylindrical insulating member adapted to be fastened to and rotated with said body, said insulating member housing a stationary contact ring assembly adapted to be connected with stationary electric sources, said contact ring assembly being held in place by said gas conducting tube passing through a central bore of the contact ring assembly which is concentrically arranged with respect to the bell-shaped body, said insulating cylinder being provided with holes arranged in its surface portion adjacent to the cylindrical surface of the contact ring assembly, said holes receiving ball-shaped contact elements adapted to make electrical contact with contact rings of said contact ring assembly, each of said ball-shaped contact elements being held in place by a spring arranged on the outer surface of and fastened to said tubular, cylindrical insulating member, said springs being adapted to be electrically connected with outgoing leads.

4. In an electrical and gas conducting device adapted to provide electrical and gaseous connections between a stationary structure and a second structure which is capable of a rotary movement relative to said stationary structure, an assembly comprising a rotatable, cylindrical bell-shaped body housing a centrally arranged gas-conducting tube connected to and rotatable with said body, said body also housing an eccentrically arranged tubular, cylindrical insulating member adapted to be fastened to and rotated with said body, said insulating member housing a stationary contact ring assembly adapted to be connected with stationary electric sources, said contact ring assembly being held in place by said gas conducting tube passing through a central bore of the contact ring assembly which is concentrically arranged with respect to the bell-shaped body, said insulating cylinder being provided with holes arranged in two staggered rows parallel to the axis of the cylindrical insulating member in its surface portion adjacent to the cylindrical surface of the contact ring assembly, said holes receiving ball-shaped contact elements adapted to make electrical contact with contact rings of said contact ring assembly, each of said ball-shaped contact elements being held in place by a spring arranged on the outer surface of and fastened to said tubular, cylindrical insulating member, said springs being adapted to be electrically connected with outgoing leads.

ANTHONY J. LOMBARDI.